United States Patent
Ragavan et al.

(10) Patent No.: US 12,373,535 B2
(45) Date of Patent: Jul. 29, 2025

(54) ESTABLISHING SYSTEM ON CHIP ROOT OF TRUST FROM MULTIPLE CHIPLET ROOTS OF TRUST

(71) Applicant: QUALCOMM Incorporated, San Diego, CA (US)

(72) Inventors: Rengarajan Ragavan, San Diego, CA (US); Changjian Gao, San Diego, CA (US); Samar Asbe, San Diego, CA (US); Shivaprasad Hongal, San Diego, CA (US); Denis Pochuev, Orinda, CA (US); Richard Wesley Bass, San Diego, CA (US); Priyanka Dosi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 174 days.

(21) Appl. No.: 18/452,209

(22) Filed: Aug. 18, 2023

(65) Prior Publication Data

US 2025/0061181 A1  Feb. 20, 2025

(51) Int. Cl.
   *G06F 21/00* (2013.01)
   *G06F 21/33* (2013.01)
   *G06F 21/57* (2013.01)
   *G06F 21/64* (2013.01)

(52) U.S. Cl.
   CPC ............ *G06F 21/33* (2013.01); *G06F 21/575* (2013.01); *G06F 21/64* (2013.01)

(58) Field of Classification Search
   None
   See application file for complete search history.

(56) References Cited

U.S. PATENT DOCUMENTS

| | | | |
|---|---|---|---|
| 2020/0099536 A1 | 3/2020 | Block et al. | |
| 2021/0117246 A1* | 4/2021 | Lal | G06F 9/3814 |
| 2021/0117249 A1* | 4/2021 | Doshi | H04L 67/1001 |
| 2022/0138286 A1* | 5/2022 | Zage | H04L 63/0428 |
| | | | 726/26 |
| 2022/0292203 A1* | 9/2022 | Severns-Williams | |
| | | | G06F 21/57 |
| 2023/0083724 A1* | 3/2023 | Cella | G05B 13/0265 |
| | | | 705/28 |

(Continued)

OTHER PUBLICATIONS

Vashistha, Nidish et al. Trust Validation of Chiplets using a Physical Inspection based Certification Authority. 2022 IEEE 72nd Electronic Components and Technology Conference (ECTC). https://ieeexplore.ieee.org/stamp/stamp.jsp?tp=&arnumber=9816465 (Year: 2022).*

(Continued)

*Primary Examiner* — Jeremiah L Avery
(74) *Attorney, Agent, or Firm* — Polsinelli

(57) ABSTRACT

Systems and techniques are provided for establishing a connection. For instance, a process may include receiving, by a first root of trust (C-ROT) of a first chiplet of a plurality of chiplets from a second C-RoT of a second chiplet, a second certificate along with security state information and debug information for the second chiplet; authenticating a security state and a debug state of the second chiplet based on the security state information and the debug information; authenticating the second certificate; and establishing a security boundary with the second chiplet.

30 Claims, 6 Drawing Sheets

(56) References Cited

U.S. PATENT DOCUMENTS

| | | | | |
|---|---|---|---|---|
| 2023/0161599 A1* | 5/2023 | Erickson | ............... | G06F 21/554 |
| | | | | 713/1 |
| 2023/0177176 A1* | 6/2023 | Erickson | ............... | G06F 21/575 |
| | | | | 726/26 |
| 2023/0289433 A1* | 9/2023 | Kakaiya | .................. | G06F 21/74 |

OTHER PUBLICATIONS

Tredennick, Nick et al. Low-Cost, No-Touch IoT Security. 2021 IEEE Green Energy and Smart Systems Conference (IGESSC). https://ieeexplore.ieee.org/stamp/stamp.jsp?tp=&arnumber=9618682 (Year: 2021).*

International Search Report and Written Opinion—PCT/US2024/041556—ISA/EPO—Nov. 5, 2024.

Trusted Computing Group: "DICE Attestation Architecture", Mar. 1, 2021, XP093217668, 36 pages, p. 13, line 1-p. 18, line 7, p. 27, line 7-p. 30, line 4.

Vashistha N., et al., "ToSHI—Towards Secure Heterogeneous Integration: Security Risks, Threat Assessment, and Assurance", IACR, International Association for Cryptologic Research, vol. 20220801:221614, Aug. 1, 2022, XP061074084, pp. 1-23, p. 13, left-hand column, line 20-p. 20, right-hand column, line 21.

* cited by examiner

ESTABLISHING SYSTEM ON CHIP ROOT OF TRUST FROM MULTIPLE CHIPLET ROOTS OF TRUST

FIELD

Aspects of the present disclosure generally relate to device security. For example, aspects of the present disclosure relate to establishing a system on chip (SoC) root of trust (RoT) from multiple chiplet RoTs.

INTRODUCTION

Computing devices typically store sensitive data owned by users or enterprises, with firmware or operating system software on the computing devices owned by a computing device or secure module manufacturer. To help secure computing devices, the firmware or software may include security measures to protect against, e.g., removing brute force attack mitigations, disabling secure boot/trust boot, and/or loading other unauthenticated firmware or software on the computing devices. As an example, a processor or SoC may include a RoT, which is a source of information, such as cryptographic keys, that is inherently trusted. In some cases, the ROT may be embedded hardware included in the SoC, such as a hardware based trusted platform module or trusted execution environment.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for device security. According to at least one illustrative example, an electronic device is provided. The electronic device includes a memory system and a processor system coupled to the memory system, the processor system including a plurality of chiplets. A first chiplet of the plurality of chiplets includes a first chiplet root of trust (C-ROT). The processor system is configured to: receive, from a second C-ROT of a second chiplet, a second certificate along with security state information and debug information for the second chiplet; authenticate a security state and a debug state of the second chiplet based on the security state information and the debug information; authenticate the second certificate; and establish a security boundary with the second chiplet.

As another example, method for secure processing is provided. The method includes: receiving, by a first root of trust (C-RoT) of a first chiplet of a plurality of chiplets from a second C-ROT of a second chiplet, a second certificate along with security state information and debug information for the second chiplet; authenticating a security state and a debug state of the second chiplet based on the security state information and the debug information; authenticating the second certificate; and establishing a security boundary with the second chiplet.

In another example, non-transitory computer-readable medium is provided. The non-transitory computer-readable medium has stored thereon instructions that, when executed by a first chiplet of a plurality of chiplets, cause the first chiplet to: receive, by a first root of trust (C-ROT) of the first chiplet from a second C-ROT of a second chiplet, a second certificate along with security state information and debug information for the second chiplet; authenticate a security state and a debug state of the second chiplet based on the security state information and the debug information; authenticate the second certificate; and establish a security boundary with the second chiplet.

As another example, an apparatus for secure processing is provided. The apparatus includes: means for receiving, by a first root of trust (C-ROT) of a first chiplet of a plurality of chiplets from a second C-ROT of a second chiplet, a second certificate along with security state information and debug information for the second chiplet; means for authenticating a security state and a debug state of the second chiplet based on the security state information and the debug information; means for authenticating the second certificate; and means for establishing a security boundary with the second chiplet.

Aspects generally include a method, apparatus, system, computer program product, non-transitory computer-readable medium, user equipment, base station, wireless communication device, and/or processing system as substantially described herein with reference to and as illustrated by the drawings and specification.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip implementations or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
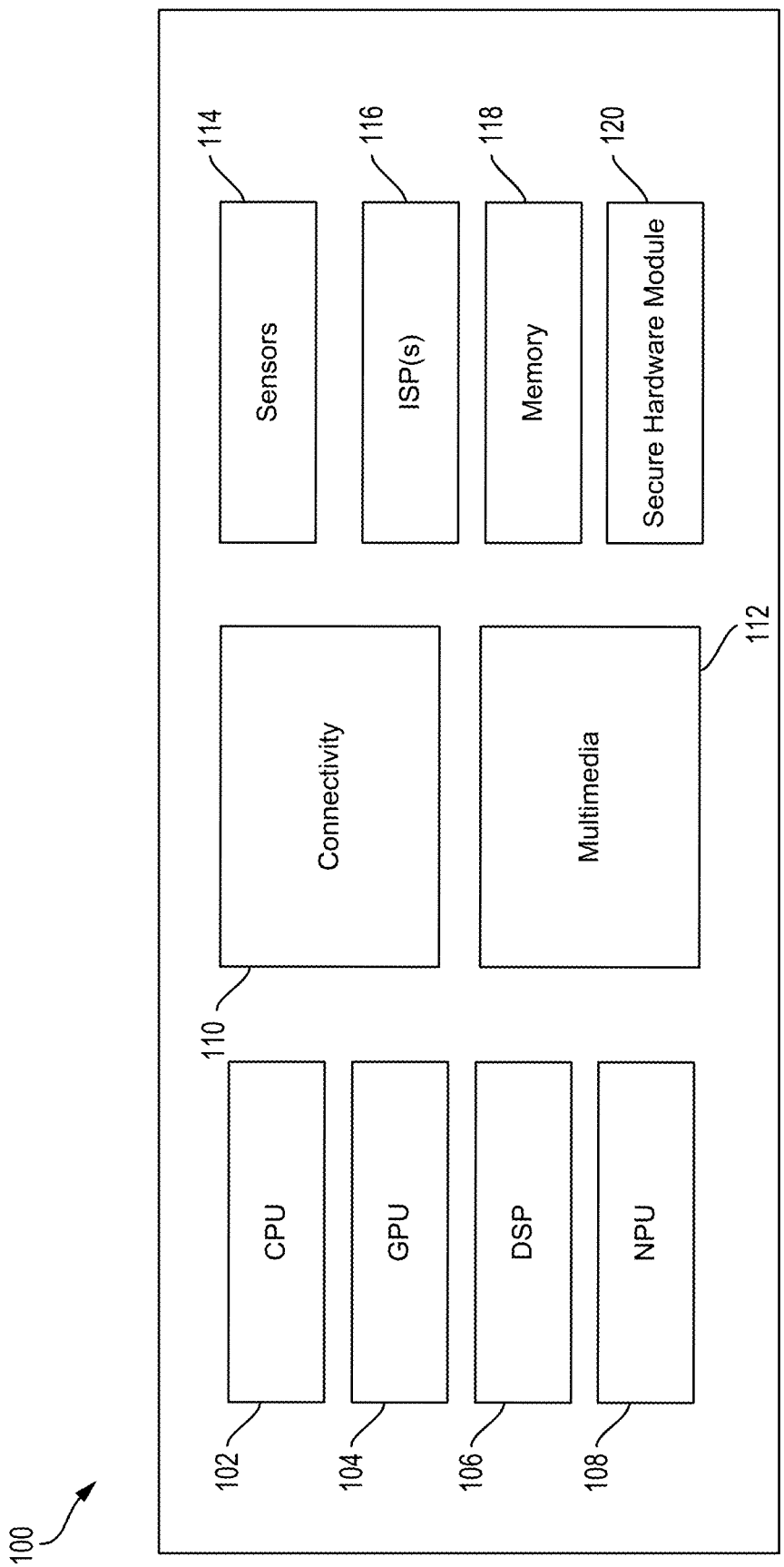
FIG. 1 illustrates an example implementation of a system-on-a-chip (SoC), in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Recently, some system-on-chip (SoC) designs have begun to use a chiplet based architecture. A chiplet may be integrated circuit block, a functional circuit block, or other like circuit block specifically designed to work with other chiplets to form a larger, more complex system, such as an SoC. A chiplet may have a well-defined set of functionality and can be combined with other chiplets having another set (or sets) sets of functionality using an interposer into a single package. In some cases, a root of trust (RoT) of a chiplet may be used to verify the security and debug states of the chiplet and the RoTs of the chiplets of an SoC and/or package may collectively establish a common security boundary for the SoC and/or package. The security boundary may refer to hardware and/or software that forms a trusted zone or boundary and provides the basis for performing security services.

Systems, apparatuses, processes (also referred to as methods), and computer-readable media (collectively referred to as "systems and techniques") are described herein for establishing a security boundary across multiple chiplets. In some cases, two or more chiplet RoTs (C-RoTs) of two or more chiplets may establish a security boundary by mutually authenticating. The mutual authentication may be performed in different ways. For example, during manufacturing, the chiplets may perform mutual authentication using certificate authentication. A common pairing key may be provisioned to the chiplets of the package after this certificate authentication. After manufacturing, chiplets of the package may mutually authenticate using certificate authentication and/or a provisioned common pairing key during each boot of the package. In some cases, the certificate authentication may be based on a provisioned common pairing key. During operation of the package of chiplets, the chiplets may mutual authenticate using the provisioned common pairing key.

Various aspects of the present disclosure will be described with respect to the figures.

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The term "mobile device" is used herein to refer to any one or all of cellular telephones, smartphones, Internet-of-things (IoT) devices, personal or mobile multimedia players, laptop computers, tablet computers, ultrabooks, palm-top computers, wireless electronic mail receivers, multimedia Internet enabled cellular telephones, wireless gaming controllers, smart cars, autonomous vehicles, and similar electronic devices which include a programmable processor, a memory and circuitry for sending and/or receiving wireless communication signals to/from wireless communication networks. While the various embodiments are particularly useful in mobile devices, such as smartphones and tablets, the embodiments are generally useful in any electronic device that includes secure boot circuitry for securing access to the electronic device.

Various aspects of the techniques described herein will be discussed below with respect to the figures. FIG. 1. FIG. 1 illustrates an example implementation of a system-on-a-chip (SoC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

In some cases, the SoC 100 may be based on an ARM instruction set. The SoC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU 102, DSP 106, and/or GPU 104. The SoC 100 may also include a sensor processor 114, image signal processors (ISPs) 116, and/or a secure hardware module 120.

The secure hardware module 120 may include fuses, replay protected memory block (RPMB), secure bits, secure flags, security enabled hardware, secure memory, or hardware, software, or firmware used to implement a secure portion of the operating system, a secure operating system (SOS), a trusted execution environment (TEE), trusted platform module (TPM), etc. The secure hardware module 120 may be used to process and/or store sensitive data in an environment that is segregated from the rich execution environment in which the operating system and/or applications may be executed. The secure hardware module 120 can be configured to execute trusted applications that provide end-to-end security for sensitive data by enforcing confidentiality, integrity, and protection of the sensitive data stored therein. The secure hardware module 120 can be used to store encryption keys, access tokens, and other sensitive data. In some cases, the secure hardware module 120 may serve as a RoT for the SoC 100. For example, the secure hardware module 120 may provide for the secure generation of cryptographic keys, limitations on the use of such cryptographic keys, and may contain one or more cryptographic keys or elements that may be used to authenticate the SoC 100. In some cases, the ROT may serve to anchor a chain of trust to validate other hardware and/or software. In some cases, the secure hardware module 120 may be implemented as a secure area of the CPU 102, as a part of the SoC 100, or any combination thereof.

Traditionally, an SoC may be designed monolithically with fixed set of components etched onto a silicon chip. Some recent SoC designs use a chiplet based architecture. A chiplet may be integrated circuit block, a functional circuit block, or other like circuit block specifically designed to work with other chiplets to form a larger, more complex system, such as an SoC. In the chiplet based architecture, the SoC may be designed using a set of chiplet that may be mixed and matched in a modular manner. For example, a chiplet may have a well-defined set of functionality and can be combined with other chiplets (e.g., having other set(s) of functionality) using an interposer into a single package. Different packages can be constructed by using different combinations of chiplets. Additionally, chiplets may be independently fabricated and then combined together into a package of chiplets at a later manufacturing stage for integration into a system, such as an SoC. An SoC may have any number of packages of chiplets.

Figure 2:
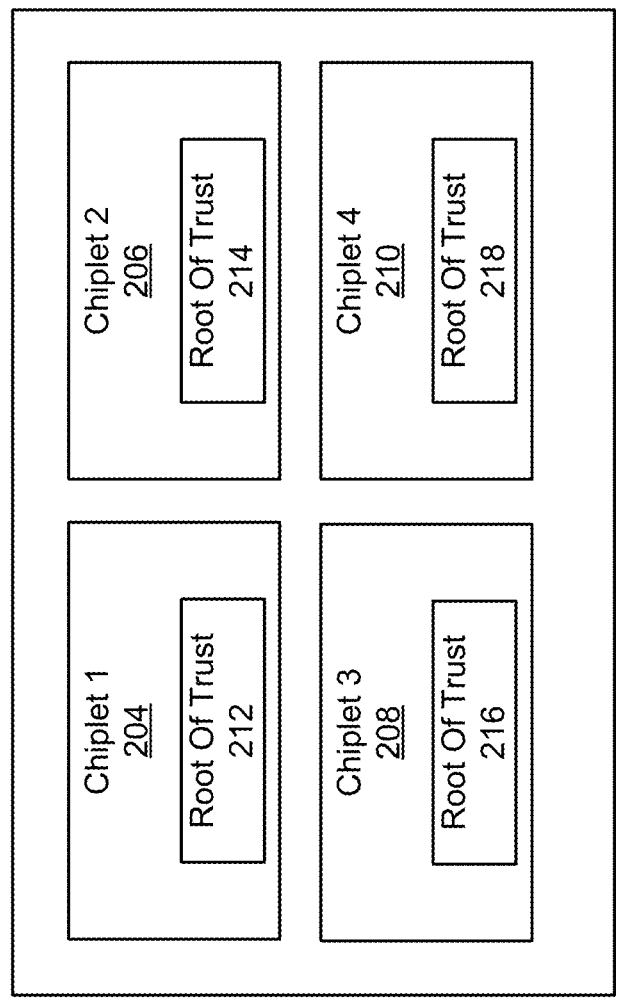
FIG. 2 is a block diagram illustrating an SoC including multiple chiplets, in accordance with aspects of the present disclosure.

FIG. 2 is a block diagram illustrating an SoC 200 including multiple chiplets, in accordance with aspects of the present disclosure. In this example, the SoC 200 includes 4 chiplets, a first chiplet 204, a second chiplet 206, a third chiplet 208, and a fourth chiplet 210. Of note, while four chiplets are shown in SoC 200, it should be understood that an SoC 200 and/or processor with implemented with chiplets can have n number of chiplets where n≥2.

In a traditional SoC, a single ROT may be used to ensure that the entire SoC is in a common security and debug state. However, in a chiplet based architecture, such as SoC 200, for the SoC 200 to operate properly, each chiplet of the SoC 200 should be in a common security and debug state. For example, chiplets operating in different security and debug states may result in operations that interfere or flat out contradict with each other. Additionally, allowing one chiplet to operate in a secure security state, while another chiplet to operate in a non-secure security state, or allowing one chiplet to operate in a debug state, while another chiplet operates in a non-debug state may provide unwanted attack vectors. In some cases, a RoT may be used to verify the security and debug states of a chiplet and establish a security boundary for the SoC. The security boundary may refer to hardware and/or software that forms a trusted zone or boundary and provides the basis for performing security services. The security boundary established by the hardware and/or software may present a boundary that is not easily bypassed/compromised by an attacker and the hardware and/or software establishing the security boundary may verify that other hardware/software used/executing within the security boundary is trusted. In a chiplet based architecture, it may be useful to allow the security boundary to extend beyond a single chiplet to encompass multiple chiplets. In some cases, a single ROT may be used to establish the security boundary across all of the chiplets. For example, where a RoT is not available (e.g., not present, disabled, etc.) in all of the chiplets, chiplets without the ROT may rely on the ROT of the chiplet with the RoT for security services. However, such an architecture may introduce latency, security, and/or performance challenges when using security services. In cases where an RoT is present in all chiplets (e.g., homogenous chiplets where multiple copies of the same chiplet are used), but only enabled in one chiplet, silicon footprint may also be wasted. Thus, techniques which allow multiple C-RoTs to work together to establish a common security boundary for the SoC 200 may be useful.

To establish a common security boundary (e.g., an SoC RoT/platform RoT), two or more C-RoTs of two or more chiplets may mutually authenticate to establish a single security boundary encompassing the chiplets. As an example, for chiplets with a C-RoT, such as the first chiplet 204 and C-RoT 212, the C-ROT for a chiplet may manage security services local to that chiplet. For example, C-RoT 212 may verify that hardware/software used/executing within the first chiplet 204 are trusted (e.g., in a common security state) and in a same debug state. The C-RoT of the chiplet may also mutually authenticate with a C-RoT of another chiplet to establish a security boundary across the chiplets. For example, C-RoT 212 of the first chiplet 204 may authenticate C-RoT 214 of the second chiplet 206 (and vice versa) and exchange information indicating that the components of the second chiplet 206 are also in common security state (e.g., trusted) and debug state. C-ROT 214 may also authenticate C-RoT 212 and obtain information from C-RoT 212 indicating that components of the first chiplet 204 are in a common security and debug state.

Figure 3:
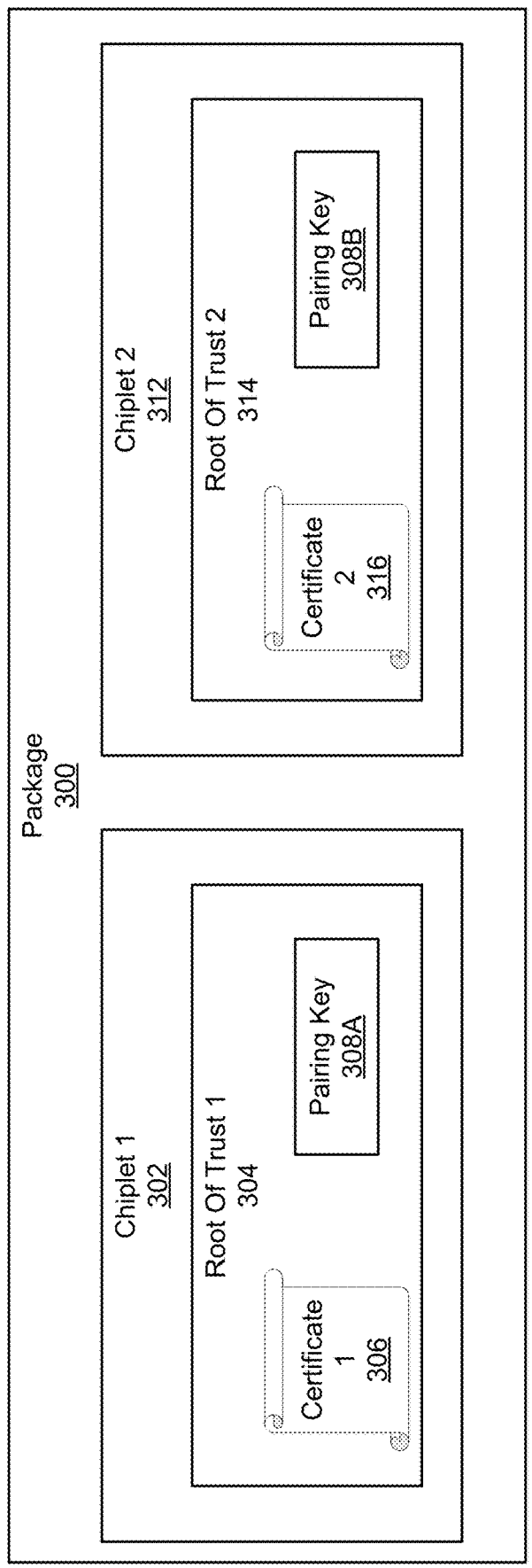
FIG. 3 is a block diagram illustrating component of RoTs of a package for mutual authentication, in accordance with aspects of the present disclosure.

FIG. 3 is a block diagram illustrating component of RoTs of a package 300 for mutual authentication, in accordance with aspects of the present disclosure. In some cases, the ability for the C-RoTs in a package, such as an SoC, to mutually authenticate may be established in stages. As shown in FIG. 3, a first C-RoT 304 of a first chiplet 302 and a second chiplet 312 and a second C-RoT 314 are included in a package 300. In some cases, chiplets may be individually fabricated/sliced. The chiplets may then be selected and packaged together in a package (e.g., the package 300) at a later stage of manufacturing. As a part of manufacturing, a C-ROT of a chiplet may be provisioned with a certificate. For example, the first C-RoT 304 of the first chiplet 302 may be provisioned with a first certificate 306 and the second C-RoT 314 of the second chiplet 312 may be provisioned with a second certificate 316. In some cases, the first certificate 306 and second certificate may be device certificates. In some cases, the certificates 306 and 316 may be relatively low-level certificates and may be signed by an intermediate certificate or a certificate authority (CA) certificate (e.g., root certificate). Intermediate certificates may be further signed by a root certificate. In some cases, device certificates may be validated using an intermediate public key and intermediate certificates may be validated using a root public key that may be provisioned in the device. In some cases, certificates may be validated using the intermediate or root certificate along with additional data, such as security policies, life cycle state, debug state, etc. In some cases, the additional data may also be written into a respective chiplet, for example by an OEM/ODM, as a part of a manufacturing process (e.g., during configuration, testing, etc.). In some cases, the CA certificate may be validated along with other information, such as security state information, debug state information, security policies, etc. While the certificates 306 and 316 may differ from chiplet to chiplet, the certificates 306 and 316 may be signed by the same CA certificate.

As indicated above, chiplets 302 and 312 may be integrated together into package 300 after the chiplets 302 and 312 are fabricated. In some cases, as a part of manufacturing the package 300, the chiplets 302 and 312 may mutually authenticate so that the C-RoTs 304 and 314 of the chiplets 302 and 312, respectively, can be provisioned with a pairing key. For example, the first C-RoT 304 may receive the second certificate 316 from the second C-RoT 314 along with security state information, security policies, and debug state information, such as a life-cycle state information, whether the chiplet is in a debug mode, etc. In some cases, the life-cycle state may indicate what part of a life-cycle the chiplet is in (e.g., provisioning, testing, engineering sample, customer sample, operating, etc.). Information security policies may indicate, for example, what security functionalities may be performed if the chiplet is in a trusted state, untrusted state, etc. The debug state may indicate whether the chiplet is in a debug state or a normal operations state. After receiving the second certificate 316, security state, and debug state information from the second C-Rot 314, the first C-ROT 304 may verify the security state and debug state from the second C-Rot 314 matches with a security state and debug state of the first C-ROT 304. The first C-ROT 304 may also verify the certificate (e.g., intermediate or root certificate) using a public key of the CA certificate (that signed second certificate 316) and/or by determining that a hash of the security policies, debug state information, life-cycle state information, and/or other information received with the second certificate 316 matches the hash values written into the first chiplet 302. The first C-RoT 304 may send an indication to the second C-RoT 314 that the first C-RoT 304 has authenticated the second C-ROT 314. The first C-RoT 304 may also send the first certificate 306, security state, and debug state to the second C-RoT 314 for authentication and receive an indication from the second C-RoT 314 that the first C-ROT has been authenticated. Once mutually authenticated, the C-RoTs 304 and 314 may be provisioned with a pairing key 308A and 308B, respectively (collectively referred to as pairing keys 308). The pairing keys 308 may be a cryptographic key and the same pairing key 308 may be provisioned for each C-RoTs 304 and 314 of the chiplets 302 and 312 of the package 300. Other packages may have different pairing keys.

In some cases, after the manufacturing stage, the package 300 may be placed into operation. In some cases, mutual authentication during an operations stage may be performed during boot of the package 300 and during run time. For example, as a part of a boot procedure of the package 300, the C-RoTs 304 and 314 of the chiplets 302 and 312 may perform mutual authentication based on the provisioned pairing key, security states, and debug states. After mutual authentication is performed, the C-RoTs 304 and 314 may extend their respective security boundaries to encompass the mutually authenticated C-RoTs (e.g., establishing a platform security boundary) such that security functionality such as secure boot, key management, access control, authenticated debug, etc., may be performed by any of the mutually authenticated C-RoTs and accepted by the other C-RoTs. In some case, each time the package is booted the C-RoTs of the package may mutually authenticate.

In some cases, the C-RoTs may mutual authenticate regularly while the package is operating to maintain the common security boundary. For example, after mutually authenticating during a boot up process, the C-RoTs may also mutually authenticate while operating, such as when performing certain functions, periodically, semi-periodically, etc. As an example, consent from all C-RoTs may be obtained before altering the security and/or debug state of the package 300 based on mutual authentication. In some cases, maintaining mutual authentication after boot of the package 300 may be performed based on the pairing key 308. For example, after the C-RoTs 304 and 314 have established a common security boundary through mutual authentication during the boot process of the package 300 (e.g., SoC, device, etc.), when requesting a security and/or debug state change the C-RoTs 304 and 314 of the package 300 may mutually authenticate using the pairing keys 308. For example, a C-ROT, such as C-RoT 304 may receive authentication information which may include security state and debug state information along with an authentication code created using the pairing key 308B from the second C-RoT 314, and the first C-RoT 304 may cryptographically verify the authentication code using its provisioned pairing key 308A along with security state and debug state information. If the authentication code, security state and debug state information matches, then the first C-ROT 304 may authenticate the second C-RoT 314, and vice versa.

Figure 4:
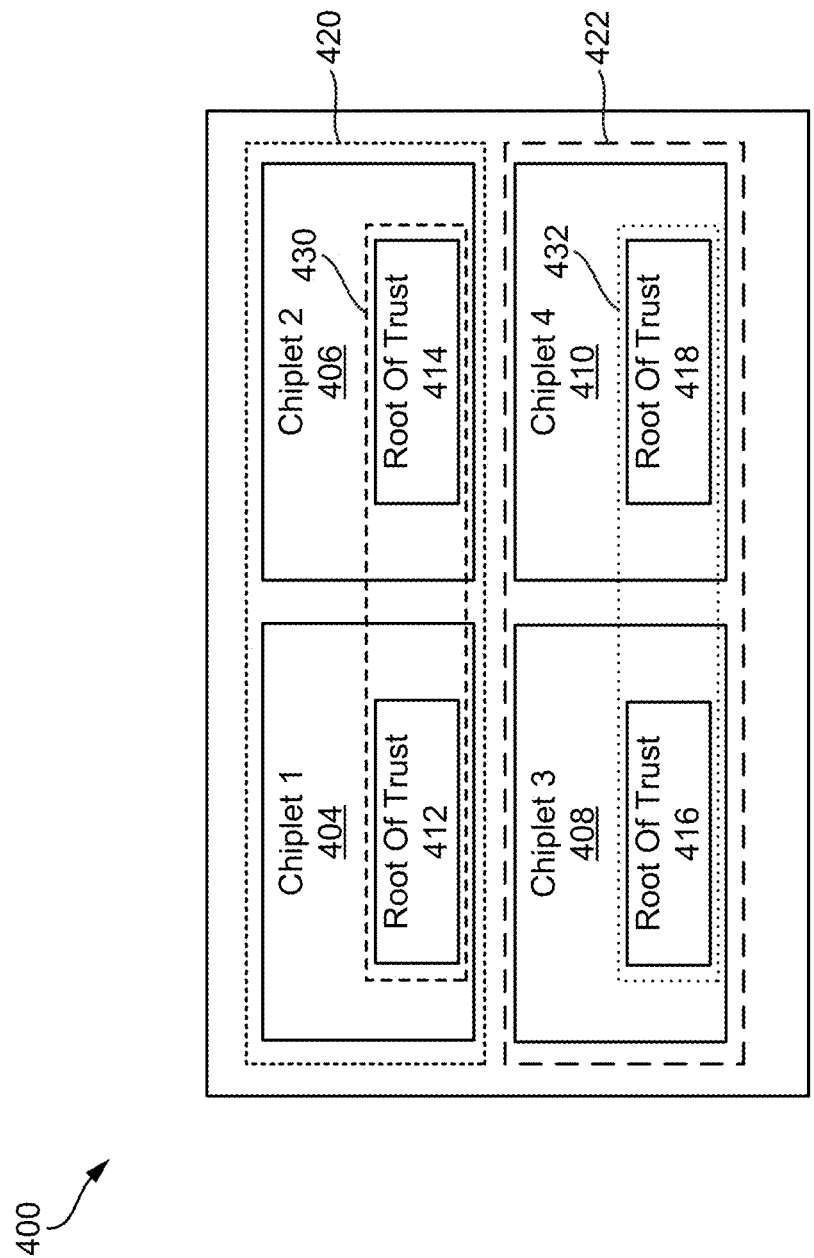
FIG. 4 is a block diagram illustrating an SoC including multiple platforms with separate security boundaries, in accordance with aspects of the present disclosure.

In some cases, multiple platforms with separate security boundaries may be established in a system, such as an SoC. FIG. 4 is a block diagram illustrating an SoC 400 including multiple platforms with separate security boundaries, in accordance with aspects of the present disclosure. In this example, SoC 400 includes four chiplets, including a first chiplet 404, a second chiplet 406, a third chiplet 408, and a fourth chiplet 410. In SoC 400, the chiplets may be divided into two platforms. A first platform 420 includes the first chiplet 404 and the second chiplet 406 and a second platform 422 includes the third chiplet 408 and the fourth chiplet 410. The C-ROT in chiplets of a platform (e.g., C-RoT 412 and C-RoT 413 for the first platform 420 and C-RoT 416 and C-ROT 418 for the second platform 422) may mutually authenticate during manufacturing, boot, and in operation in a manner substantially similar to that described above with respect to FIGS. 2 and 3. Thus, C-RoT 412 and C-RoT 414 may establish a first security boundary 430 and C-RoT 416 and C-ROT 418 may establish a second security boundary 432 and a C-ROT. While a C-ROT, such as C-RoT 412, may trust security functions performed within a security boundary, such as the first security boundary 430, the C-RoT 412 may not trust a security function being performed across the security boundaries, such as by C-RoT 416 and/or C-RoT 418 in the second security boundary 432. In some cases, platform of a system, such as SoC 400, may be static and may be set up during manufacturing.

Figure 5:
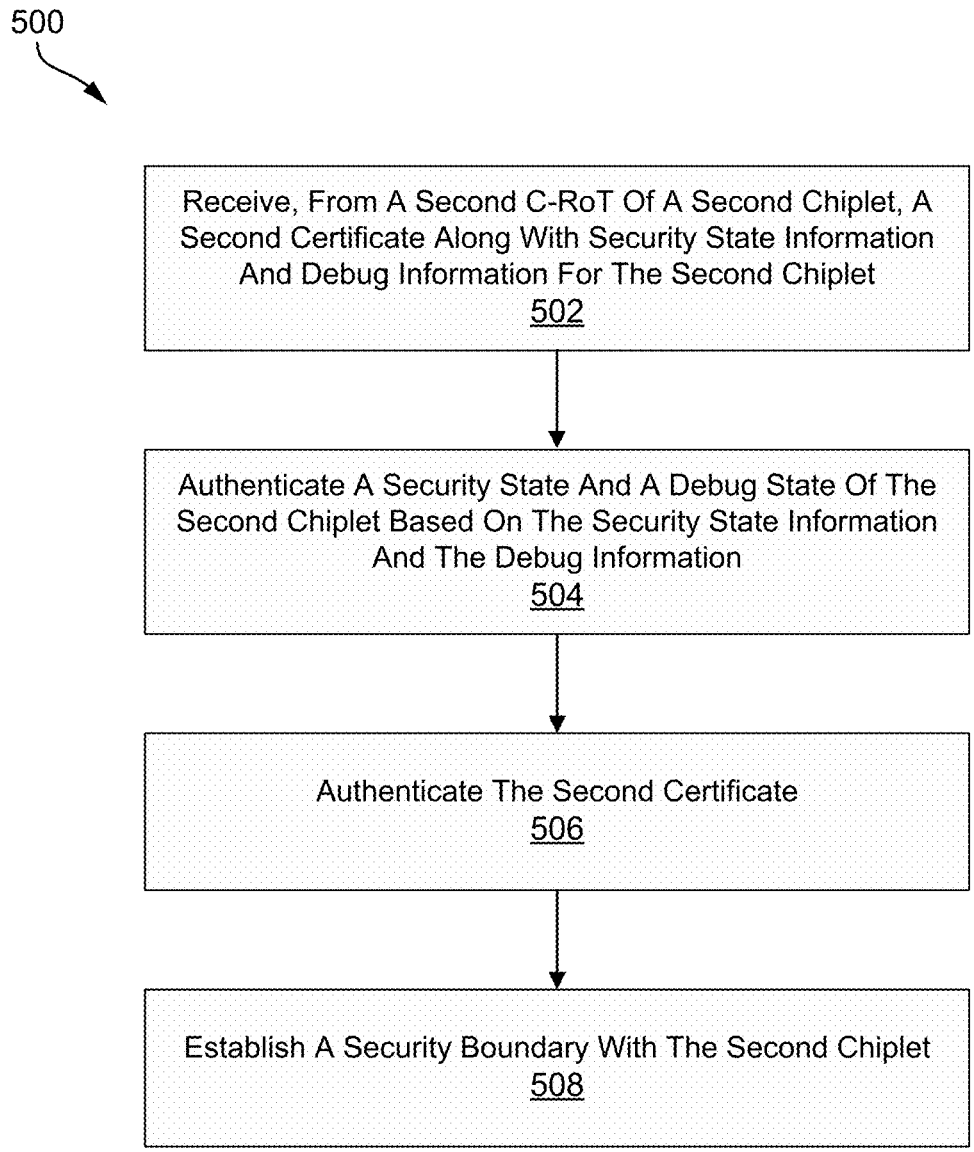
FIG. 5 is a flow diagram illustrating an example of a process for secure processing, in accordance with aspects of the present disclosure.

FIG. 5 is a flow diagram illustrating an example of a process 500 for secure processing, in accordance with aspects of the present disclosure. The process 500 may be performed by a wireless device or by a component (e.g., SoC 100 of FIG. 1, SoC 200 of FIG. 2, chiplets 204-210 of FIG. 2, C-RoTs 212-218 of FIG. 2, package 300 of FIG. 3, chiplets 302 and 312 of FIG. 3, C-RoTs 304 and 314 of FIG. 3, SoC 400 of FIG. 4, chiplets 404-410 of FIG. 4, C-RoTs 412-418 of FIG. 4, processor 610 of FIG. 6, etc.) or system (e.g., a chipset) of the wireless device (e.g., computing system 600). The electronic device may be a wireless device, such as computing system 600, or a UE (e.g., a mobile device such as a mobile phone, a network-connected wearable such as a watch, an extended reality device such as a virtual reality (VR) device or augmented reality (AR) device, a vehicle or component or system of a vehicle, or other type of UE) or other type of network node. In some examples, the process 500 may be performed by a UE. The operations of the process 500 may be implemented, in part, as software components that are executed and run on one or more processors (e.g., CPU 102 of FIG. 1, chiplets 204-210 of FIG. 2, C-RoTs 212-218 of FIG. 2, chiplets 302 and 312 of FIG. 3, C-RoTs 304 and 314 of FIG. 3, chiplets 404-410 of FIG. 4, C-RoTs 412-418 of FIG. 4, processor 610 of FIG. 6, or other processor(s)).

At block 502, the computing device (or component thereof) may receive, by a first root of trust (C-RoT) (e.g., C-RoTs 212-218 of FIG. 2, C-RoTs 304 and 314 of FIG. 3, chiplets 404-410 of FIG. 4, C-RoTs 412-418 of FIG. 4, etc.) of a first chiplet of a plurality of chiplets from a second C-ROT of a second chiplet, a second certificate (e.g., certificates 306 and 316 of FIG. 3) along with security state information and debug information for the second chiplet. In some cases, the computing device (or component thereof) may receive a first certificate as a part of fabricating the first chiplet. In some cases, the computing device (or component thereof) may determine, by the first C-ROT of the first chiplet, a first security state and a first debug state for the first chiplet; and transmit the first certificate, information about the first security state, and information about the first debug state to the second chiplet for authentication. For example, the C-RoT of the second chiplet may authenticate the C-RoT of the first chiplet in a manner similar to the C-RoT of the first chiplet authenticating the C-RoT of the second chiplet. In some cases, the processor system includes a plurality of platforms and the first chiplet and second chiplet are in a platform of the plurality of platforms. In some cases, each platform, of the plurality of platforms, includes at least two chiplets.

At block 504, the computing device (or component thereof) may authenticate a security state and a debug state of the second chiplet based on the security state information and the debug information (e.g., security state information, security policies, and debug state information, such as a life-cycle state information, whether the chiplet is in a debug mode, etc.).

At block 506, the computing device (or component thereof) may authenticate the second certificate. For example, the certificate may be authenticated by a public key or other certification authentication technique. In some cases, the security state and debug state of the second chiplet is authenticated by: matching the first security state to the security state information and matching the first debug state to the debug information.

At block 508, the computing device (or component thereof) may establish a security boundary with the second chiplet. The security boundary may refer to hardware and/or software that forms a trusted zone or boundary and provides the basis for performing security services. In some cases, the computing device (or component thereof) may receive, from the second chiplet, an indication that the first chiplet has been authenticated. In some cases, the security boundary is established based on the indication that the first chiplet has been authenticated, the authentication of the security state and debug state, and the authentication of the second certificate. In some examples, the security boundary is maintained after the boot process for the processor system. In some cases, the computing device (or component thereof) may receive a first pairing key as a part of a provisioning procedure for the processor system; receive authentication information associated with a second pairing key from the second chiplet, wherein the second pairing key is received by the second chiplet as a part of the provisioning procedure; and maintain the security boundary by verifying the authentication information based on the first pairing key. For example, after boot, the chiplets may exchange authentication information and cryptographically verify the authentication information with provisioned pairing keys. Verification of the pairing keys (e.g., based on authentication information and a provisioned pairing key of a chiplet) may be performed in place of certificate authentication.

In some examples, the processes described herein (e.g., process 500, and/or other process described herein) may be performed by a computing device or apparatus (e.g., a network node such as a UE, base station, a portion of a base station, etc.). For example, as noted above, one or more of the processes described herein (e.g., the process 500, and/or other process described herein) may be performed by a UE.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the WiFi (802.11x)

standards, data according to the Bluetooth™ standard, data according to the Internet Protocol (IP) standard, and/or other types of data.

The components of the computing device may be implemented in circuitry. For example, the components may include and/or may be implemented using electronic circuits or other electronic hardware, which may include one or more programmable electronic circuits (e.g., microprocessors, graphics processing units (GPUs), digital signal processors (DSPs), central processing units (CPUs), and/or other suitable electronic circuits), and/or may include and/or be implemented using computer software, firmware, or any combination thereof, to perform the various operations described herein.

The process 500 is illustrated as a logical flow diagram, the operation of which represent a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, process 500 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 6:
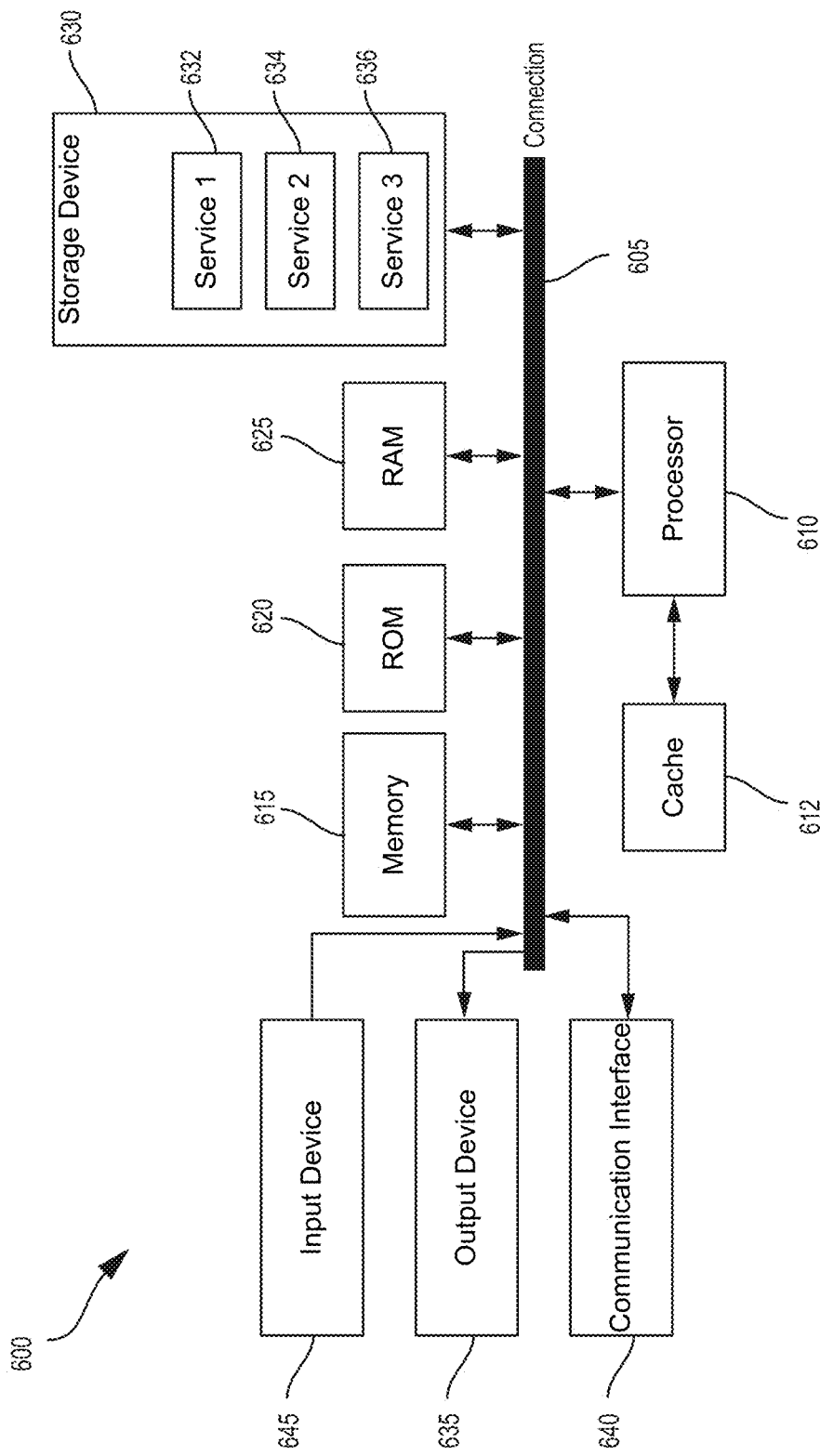
FIG. 6 is a block diagram illustrating an example of a computing system, in accordance with some examples.

FIG. 6 is a diagram illustrating an example of a system for implementing certain aspects of the present technology. In particular, FIG. 6 illustrates an example of computing system 600, which may be for example any computing device making up internal computing system, a remote computing system, a camera, or any component thereof in which the components of the system are in communication with each other using connection 605. Connection 605 may be a physical connection using a bus, or a direct connection into processor 610, such as in a chipset architecture. Connection 605 may also be a virtual connection, networked connection, or logical connection.

In some aspects, computing system 600 is a distributed system in which the functions described in this disclosure may be distributed within a datacenter, multiple data centers, a peer network, etc. In some aspects, one or more of the described system components represents many such components each performing some or all of the function for which the component is described. In some aspects, the components may be physical or virtual devices.

Example computing system 600 includes at least one processing unit (CPU or processor) 610 and connection 605 that communicatively couples various system components including system memory 625, such as read-only memory (ROM) 620 and random access memory (RAM) 625 to processor 610. Computing system 600 may include a cache 612 of high-speed memory connected directly with, in close proximity to, or integrated as part of processor 610.

Processor 610 may include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which may represent any number of input mechanisms, such as a microphone for speech, a touch-sensitive screen for gesture or graphical input, keyboard, mouse, motion input, speech, etc. Computing system 600 may also include output device 635, which may be one or more of a number of output mechanisms. In some instances, multimodal systems may enable a user to provide multiple types of input/output to communicate with computing system 600.

Computing system 600 may include communications interface 640, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 630 may include software services, servers, services, etc., that when the code that defines such software is executed by the processor 610, it causes the system to perform a function. In some aspects, a hardware service that performs a particular function may include the software component stored in a computer-readable medium in connection with the necessary hardware components, such as processor 610, connection 605, output device 635, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices.

Any features described as modules or components may be implemented together in an integrated logic device or separately as discrete but interoperable logic devices. If implemented in software, the techniques may be realized at least in part by a computer-readable data storage medium comprising program code including instructions that, when executed by one or more processors, performs one or more of the methods, algorithms, and/or operations described above. The computer-readable data storage medium may form part of a computer program product, which may include packaging materials. The computer-readable medium and/or memory system may comprise any memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, memory 615, read-only memory (ROM) 620, random access memory (RAM) 625, storage device 630, and the like, and the computer-readable medium may include multiple memories or data storage media. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor system, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor system may be configured to perform any of the techniques described in this disclosure. A general-purpose processor may be a microprocessor; but in the alternative, the processor may be any conventional processor, controller, microcontroller, or state machine. A processor system may also be implemented as a combination of computing devices, e.g., a combination of a DSP and a microprocessor, a plurality of microprocessors, one or more microprocessors in conjunction with a DSP core, or any other such configuration. Accordingly, the term "processor system," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C. A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative aspects of the disclosure include:

Aspect 1. An electronic device, comprising: a memory system; and a processor system coupled to the memory system, the processor system including a plurality of chiplets, wherein a first chiplet of the plurality of chiplets includes a first chiplet root of trust (C-RoT) and is configured to: receive, from a second C-ROT of a second chiplet, a second certificate along with security state information and debug information for the second chiplet; authenticate a security state and a debug state of the second chiplet based on the security state information and the debug information; authenticate the second certificate; and establish a security boundary with the second chiplet.

Aspect 2. The electronic device of Aspect 1, wherein the first chiplet is further configured to receive a first certificate as a part of fabricating the first chiplet.

Aspect 3. The electronic device of Aspect 2, wherein the first chiplet is further configured to: determine, by the first C-ROT of the first chiplet, a first security state and a first debug state for the first chiplet; and transmit the first certificate, information about the first security state, and information about the first debug state to the second chiplet for authentication.

Aspect 4. The electronic device of Aspect 3, wherein the first chiplet is further configured to receive, from the second chiplet, an indication that the first chiplet has been authenticated, wherein the security boundary is established based on the indication that the first chiplet has been authenticated, the authentication of the security state and debug state, and the authentication of the second certificate.

Aspect 5. The electronic device of Aspect 4, wherein, to authenticate the security state and debug state of the second chiplet, the first chiplet is configured to: match the first security state to the security state information; and match the first debug state to the debug information.

Aspect 6. The electronic device of any of Aspects 1-5, wherein the security boundary is established as a part of a boot process for the processor system.

Aspect 7. The electronic device of Aspect 6, wherein the first chiplet is further configured to: receive a first pairing key as a part of a provisioning procedure for the processor system; receive authentication information associated with a second pairing key from the second chiplet, wherein the second pairing key is received by the second chiplet as a part of the provisioning procedure; and maintain the security boundary by verifying the authentication information based on the first pairing key.

Aspect 8. The electronic device of Aspect 7 wherein the security boundary is maintained after the boot process for the processor system.

Aspect 9. The electronic device of any of Aspects 1-8, wherein the processor system includes a plurality of platforms and wherein the first chiplet and second chiplet are in a platform of the plurality of platforms.

Aspect 10. The electronic device of Aspect 9, wherein each platform, of the plurality of platforms, includes at least two chiplets.

Aspect 11. A method for secure processing, comprising: receiving, by a first root of trust (C-RoT) of a first chiplet of a plurality of chiplets from a second C-ROT of a second chiplet, a second certificate along with security state information and debug information for the second chiplet; authenticating a security state and a debug state of the second chiplet based on the security state information and the debug information; authenticating the second certificate; and establishing a security boundary with the second chiplet.

Aspect 12. The method of Aspect 11, further comprising receiving, by the first C-ROT a first certificate as a part of fabricating the first chiplet.

Aspect 13. The method of Aspect 12, further comprising: determining, by the first C-ROT of the first chiplet, a first security state and a first debug state for the first chiplet; and transmitting the first certificate, information about the first security state, and information about the first debug state to the second chiplet for authentication.

Aspect 14. The method of Aspect 13, further comprising receiving, from the second chiplet, an indication that the first chiplet has been authenticated, wherein the security boundary is established based on the indication that the first chiplet has been authenticated, the authentication of the security state and debug state, and the authentication of the second certificate.

Aspect 15. The method of Aspect 14, wherein, authenticating the security state and debug state of the second chiplet comprises: matching the first security state to the security state information; and matching the first debug state to the debug information.

Aspect 16. The method of any of Aspects 11-15, wherein the security boundary is established as a part of a boot process for the plurality of chiplets.

Aspect 17. The method of Aspect 16, further comprising: receiving a first pairing key as a part of a provisioning procedure the plurality of chiplets; receiving authentication information associated with a second pairing key from the second chiplet, wherein the second pairing key is received by the second chiplet as a part of the provisioning procedure; and maintaining the security boundary by verifying the authentication information based on the first pairing key.

Aspect 18. The method of Aspect 17 wherein the security boundary is maintained after the boot process for the plurality of chiplets.

Aspect 19. The method of any of Aspects 11-18, wherein a processor system includes a plurality of platforms and wherein the first chiplet and second chiplet are in a platform of the plurality of platforms.

Aspect 20. The method of Aspect 19, wherein each platform, of the plurality of platforms, includes at least two chiplets.

Aspect 21. A non-transitory computer-readable medium having stored thereon instructions that, when executed by a first chiplet of a plurality of chiplets, cause the first chiplet to: receive, by a first root of trust (C-ROT) of the first chiplet from a second C-ROT of a second chiplet, a second certificate along with security state information and debug information for the second chiplet; authenticate a security state and a debug state of the second chiplet based on the security state information and the debug information; authenticate the second certificate; and establish a security boundary with the second chiplet.

Aspect 22. The non-transitory computer-readable medium of Aspect 21, wherein the instructions cause the first chiplet to receive a first certificate as a part of fabricating the first chiplet.

Aspect 23. The non-transitory computer-readable medium of Aspect 22, wherein the instructions cause the first chiplet to: determine, by the first C-ROT of the first chiplet, a first security state and a first debug state for the first chiplet; and transmit the first certificate, information about the first security state, and information about the first debug state to the second chiplet for authentication.

Aspect 24. The non-transitory computer-readable medium of Aspect 23, wherein the instructions cause the first chiplet to receive, from the second chiplet, an indication that the first chiplet has been authenticated, wherein the security boundary is established based on the indication that the first chiplet has been authenticated, the authentication of the security state and debug state, and the authentication of the second certificate.

Aspect 25. The non-transitory computer-readable medium of Aspect 24, wherein, to authenticate the security state and debug state of the second chiplet, the instructions cause the first chiplet to: match the first security state to the security state information; and match the first debug state to the debug information.

Aspect 26. The non-transitory computer-readable medium of any of Aspects 21-25, wherein the security boundary is established as a part of a boot process for the plurality of chiplets.

Aspect 27. The non-transitory computer-readable medium of Aspect 26, wherein the instructions cause the first chiplet: receive a first pairing key as a part of a provisioning procedure for the plurality of chiplets; receive authentication information associated with a second pairing key from the second chiplet, wherein the second pairing key is received by the second chiplet as a part of the provisioning procedure; and maintain the security boundary by verifying the authentication information based on the first pairing key.

Aspect 28. The non-transitory computer-readable medium of Aspect 27 wherein the security boundary is maintained after the boot process for the plurality of chiplets.

Aspect 29. The non-transitory computer-readable medium of any of Aspects 21-28, wherein a processor system includes a plurality of platforms and wherein the first chiplet and second chiplet are in a platform of the plurality of platforms.

Aspect 30. The non-transitory computer-readable medium of Aspect 29, wherein each platform, of the plurality of platforms, includes at least two chiplets.

Aspect 31. An apparatus for wireless communications, comprising one or more means for performing operations according to any of Aspects 11 to 20.

What is claimed is:

1. An electronic device, comprising:
   a memory system; and
   a processor system coupled to the memory system, the processor system including a plurality of chiplets, wherein a first chiplet of the plurality of chiplets includes a first chiplet root of trust (C-RoT) and is configured to:
     receive, from a second C-ROT of a second chiplet, a second certificate along with security state information and debug information for the second chiplet;
     authenticate a security state and a debug state of the second chiplet based on the security state information and the debug information;
     authenticate the second certificate; and
     establish a security boundary with the second chiplet.

2. The electronic device of claim 1, wherein the first chiplet is further configured to receive a first certificate as a part of fabricating the first chiplet.

3. The electronic device of claim 2, wherein the first chiplet is further configured to:
   determine, by the first C-ROT of the first chiplet, a first security state and a first debug state for the first chiplet; and
   transmit the first certificate, information about the first security state, and information about the first debug state to the second chiplet for authentication.

4. The electronic device of claim 3, wherein the first chiplet is further configured to receive, from the second chiplet, an indication that the first chiplet has been authenticated, wherein the security boundary is established based on the indication that the first chiplet has been authenticated, the authentication of the security state and debug state, and the authentication of the second certificate.

5. The electronic device of claim 4, wherein, to authenticate the security state and debug state of the second chiplet, the first chiplet is configured to:
   match the first security state to the security state information; and
   match the first debug state to the debug information.

6. The electronic device of claim 1, wherein the security boundary is established as a part of a boot process for the processor system.

7. The electronic device of claim 6, wherein the first chiplet is further configured to:
receive a first pairing key as a part of a provisioning procedure for the processor system;
receive authentication information associated with a second pairing key from the second chiplet, wherein the second pairing key is received by the second chiplet as a part of the provisioning procedure; and
maintain the security boundary by verifying the authentication information based on the first pairing key.

8. The electronic device of claim 7 wherein the security boundary is maintained after the boot process for the processor system.

9. The electronic device of claim 1, wherein the processor system includes a plurality of platforms and wherein the first chiplet and second chiplet are in a platform of the plurality of platforms.

10. The electronic device of claim 9, wherein each platform, of the plurality of platforms, includes at least two chiplets.

11. A method for secure processing, comprising:
receiving, by a first root of trust (C-RoT) of a first chiplet of a plurality of chiplets from a second C-ROT of a second chiplet, a second certificate along with security state information and debug information for the second chiplet;
authenticating a security state and a debug state of the second chiplet based on the security state information and the debug information;
authenticating the second certificate; and
establishing a security boundary with the second chiplet.

12. The method of claim 11, further comprising receiving, by the first C-ROT a first certificate as a part of fabricating the first chiplet.

13. The method of claim 12, further comprising:
determining, by the first C-ROT of the first chiplet, a first security state and a first debug state for the first chiplet; and
transmitting the first certificate, information about the first security state, and information about the first debug state to the second chiplet for authentication.

14. The method of claim 13, further comprising receiving, from the second chiplet, an indication that the first chiplet has been authenticated, wherein the security boundary is established based on the indication that the first chiplet has been authenticated, the authentication of the security state and debug state, and the authentication of the second certificate.

15. The method of claim 14, wherein, authenticating the security state and debug state of the second chiplet comprises:
matching the first security state to the security state information; and
matching the first debug state to the debug information.

16. The method of claim 11, wherein the security boundary is established as a part of a boot process for the plurality of chiplets.

17. The method of claim 16, further comprising:
receiving a first pairing key as a part of a provisioning procedure the plurality of chiplets;
receiving authentication information associated with a second pairing key from the second chiplet, wherein the second pairing key is received by the second chiplet as a part of the provisioning procedure; and
maintaining the security boundary by verifying the authentication information based on the first pairing key.

18. The method of claim 17 wherein the security boundary is maintained after the boot process for the plurality of chiplets.

19. The method of claim 11, wherein a processor system includes a plurality of platforms and wherein the first chiplet and second chiplet are in a platform of the plurality of platforms.

20. The method of claim 19, wherein each platform, of the plurality of platforms, includes at least two chiplets.

21. A non-transitory computer-readable medium having stored thereon instructions that, when executed by a first chiplet of a plurality of chiplets, cause the first chiplet to:
receive, by a first root of trust (C-RoT) of the first chiplet from a second C-ROT of a second chiplet, a second certificate along with security state information and debug information for the second chiplet;
authenticate a security state and a debug state of the second chiplet based on the security state information and the debug information;
authenticate the second certificate; and
establish a security boundary with the second chiplet.

22. The non-transitory computer-readable medium of claim 21, wherein the instructions cause the first chiplet to receive a first certificate as a part of fabricating the first chiplet.

23. The non-transitory computer-readable medium of claim 22, wherein the instructions cause the first chiplet to:
determine, by the first C-ROT of the first chiplet, a first security state and a first debug state for the first chiplet; and
transmit the first certificate, information about the first security state, and information about the first debug state to the second chiplet for authentication.

24. The non-transitory computer-readable medium of claim 23, wherein the instructions cause the first chiplet to receive, from the second chiplet, an indication that the first chiplet has been authenticated, wherein the security boundary is established based on the indication that the first chiplet has been authenticated, the authentication of the security state and debug state, and the authentication of the second certificate.

25. The non-transitory computer-readable medium of claim 24, wherein, to authenticate the security state and debug state of the second chiplet, the instructions cause the first chiplet to:
match the first security state to the security state information; and
match the first debug state to the debug information.

26. The non-transitory computer-readable medium of claim 21, wherein the security boundary is established as a part of a boot process for the plurality of chiplets.

27. The non-transitory computer-readable medium of claim 26, wherein the instructions cause the first chiplet:
receive a first pairing key as a part of a provisioning procedure for the plurality of chiplets;
receive authentication information associated with a second pairing key from the second chiplet, wherein the second pairing key is received by the second chiplet as a part of the provisioning procedure; and
maintain the security boundary by verifying the authentication information based on the first pairing key.

28. The non-transitory computer-readable medium of claim 27 wherein the security boundary is maintained after the boot process for the plurality of chiplets.

29. The non-transitory computer-readable medium of claim 21, wherein a processor system includes a plurality of platforms and wherein the first chiplet and second chiplet are in a platform of the plurality of platforms.

30. The non-transitory computer-readable medium of claim 29, wherein each platform, of the plurality of platforms, includes at least two chiplets.

* * * * *